March 12, 1968    H. O. CORBETT ETAL    3,372,920
METHOD FOR PRODUCING THERMOPLASTIC SHEET MATERIAL
Filed July 12, 1965    2 Sheets-Sheet 1
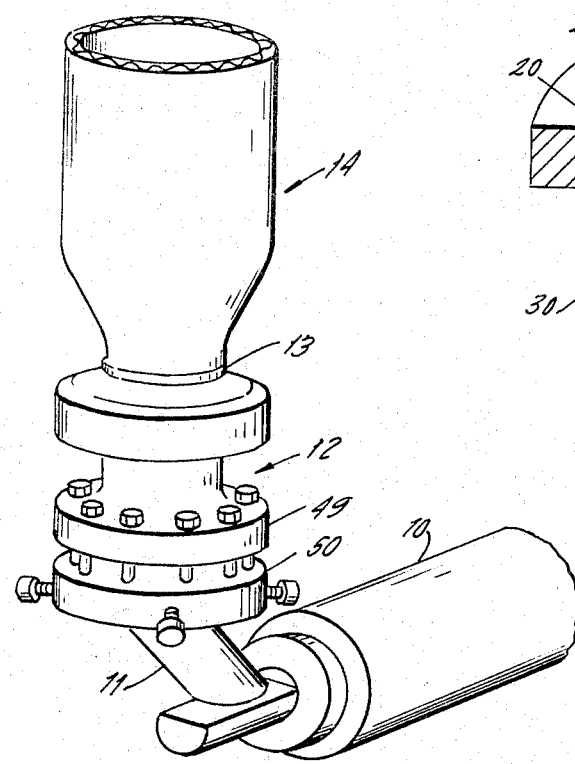
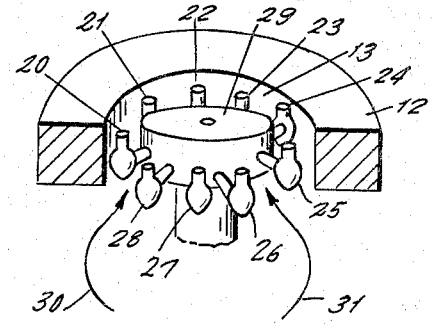
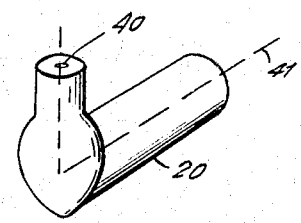
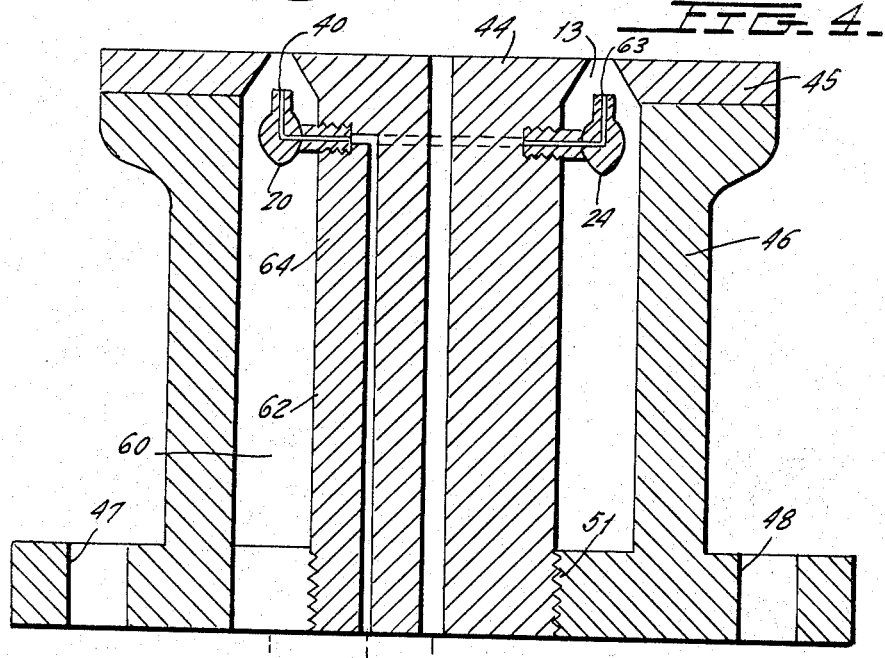

March 12, 1968 H. O. CORBETT ET AL 3,372,920
METHOD FOR PRODUCING THERMOPLASTIC SHEET MATERIAL
Filed July 12, 1965 2 Sheets-Sheet 2
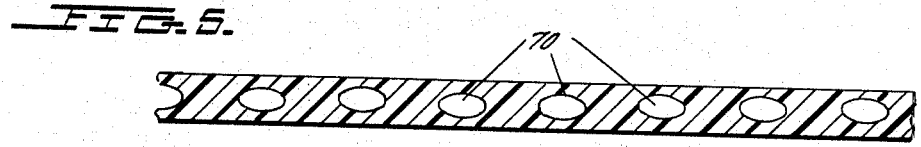
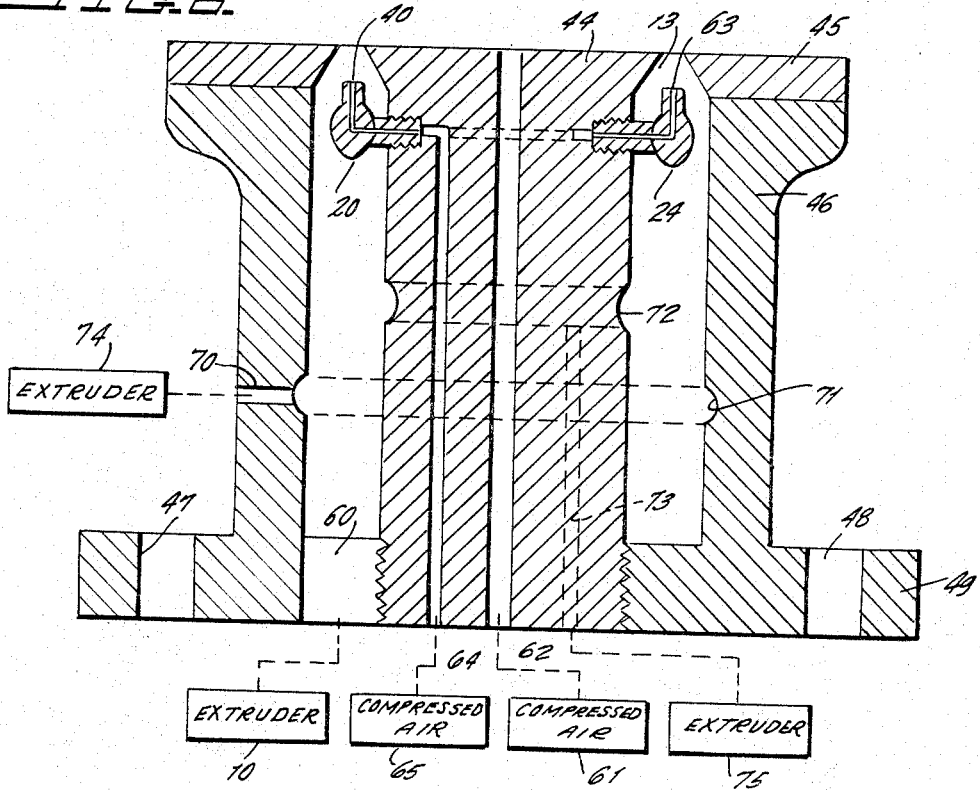
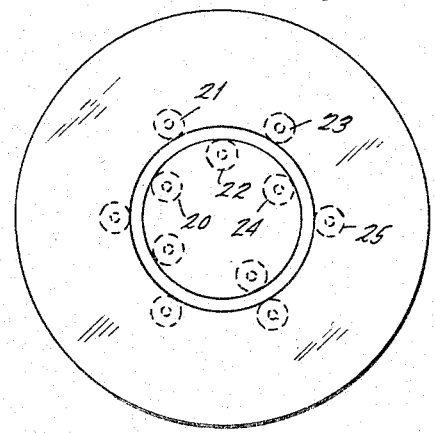
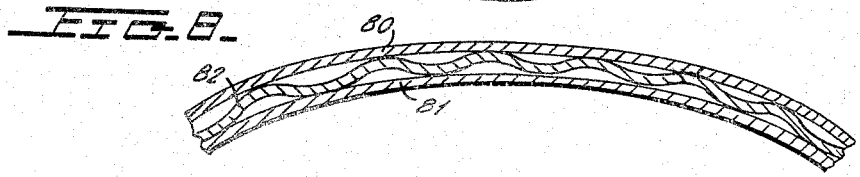

United States Patent Office 3,372,920
Patented Mar. 12, 1968

3,372,920
METHOD FOR PRODUCING THERMOPLASTIC SHEET MATERIAL
Herbert O. Corbett, Bridgeport, and John J. Quackenbush, Monroe, Conn., assignors to National Distillers and Chemical Corporation, New York, N.Y., a corporation of Virginia
Filed July 12, 1965, Ser. No. 471,018
2 Claims. (Cl. 264—95)

ABSTRACT OF THE DISCLOSURE

Extrusion die and method for producing corrugated thermoplastic film, the die including spaced core pins for introducing parallel air-streams into the extruded film and, where three-layered corrugated thermoplastic film is produced, the die including spaced and alternately offset core pins whereby the extruded product is constituted by smooth outer layers and a central uniformly corrugated inner layer, each layer originating from a separate source of plastic material.

---

This invention relates to a novel corrugated thermoplastic film or sheet and to the method of manufacture thereof wherein air pockets are introduced into a thermoplastic sheet or film during the manufacture thereof, thereby imparting to the material an effectively corrugated configuration.

Accordingly, a primary object of this invention is to provide a novel method of manufacture of thermoplastic materials for causing a cross-sectional configuration of the material which is the equivalent of a corrugated construction.

Yet another object of this invention is to provide a novel method of manufacture for a corrugated thermoplastic material.

Another object of this invention is to form a film of thermoplastic material which has improved physical strength, tear abrasion resistance and stiffness.

These and other objects of this invention will become apparent from the following description when taken in connection with the drawings, in which:

FIGURE 1 is a perspective view of the general apparatus used in accordance with the invention.

FIGURE 2 schematically illustrates the placement of overlay core pins within the extrusion die for forming the corrugated structure for the film.

FIGURE 3 is an enlarged perspective view of one of the core pins of FIGURE 2.

FIGURE 4 is a cross-sectional view of the die of FIGURES 1 and 2, and illustrates the manner in which the core pins are connected to the die mandrel.

FIGURE 5 is a cross-sectional view of thermoplastic material extruded from the die of FIGURE 4 which has air channels therein which impart the effect of a corrugated construction to the material.

FIGURE 6 is a cross-sectional view of an extrusion die similar to that of FIGURE 4 which is modified for the production of film having three laminated layers wherein the central layer is in internal contact with the outer lays thereby defining a corrugated-type product.

FIGURE 7 is a top view of the extrusion die of FIGURE 6 illustrating the staggered placement of the core pins.

FIGURE 8 is a cross-sectional view of the material extruded from the die of FIGURES 6 and 7.

Referring first to FIGURE 1, there is illustrated therein a generally well known extrusion system which has been modified in accordance with the invention. Thus, the extrusion system of FIGURE 1 includes the output of some suitable extruder 10 which is connected through the conduit 11 to an extrusion die 12. The extrusion die 12 is then operable to extrude through an outlet orifice 13 a tube of plastic film 14 which can, for example, be drawn up by overhead nip rolls and thence to a suitable storage roll means, as is well known in the art.

In accordance with the invention, the extruded tube 14 will have the configuration shown in FIGURE 5 or 8, and has the effective configuration of a corrugated material. This novel result is accomplished in accordance with the invention through the placement of core pins in the exit orifice of the die which permits the passage of low pressure compressed air into the interior of the film being extruded.

Thus, as illustrated in FIGURE 2, a plurality of core pins or spaced grooves or channels 20 through 28 are all supported from a common central mandrel 29 adjacent the exit orifice 13 of the die. Material being discharged from exit orifice 13 will then flow, as illustrated as arrows 30 and 31 in FIGURE 2, so as to flow around the core pins, whereby air being ejected from the central channels of the core pins will be captured as air channels embedded within the extruded film.

Each of the core pins is preferably streamlined so as to interfere as little as possible with the flow of extruded material, and preferably has the streamline shape illustrated in FIGURE 3 for core pin 20.

It will be noted that the core pin 20, as well as all of the core pins used, will have an orifice 40 extending down from the top thereof and through the central body thereof, as schematically illustrated by the dotted line 41 so that an air supply can be connected to one end of the core pins and ejected from the discharge ends thereof in the flow stream of the thermoplastic material.

FIGURE 4 illustrates a cross-sectional view of the extrusion die of FIGURES 1 and 2 in more detail, and particularly illustrates the securement of core pins in the die mandrel. Referring now to FIGURE 4, the exit orifice 13 is defined between the upper end of a central mandrel 44 and a circular nozzle ring 45. The nozzle ring 45 is then carried on the circular die body 46 which has suitable openings such as openings 47 and 48 through the lower flange 49 thereof to permit securement of the die body to the extruder flange 50, shown in FIGURE 1. Mandrel 44 is then secured to body 46 as by the threaded connection 51.

The conduit 11 of FIGURE 1 extending from extruder 10 is then connected to the annular passage 60 of FIGURE 4 which is formed between the die body 46 and mandrel 44. Thus, material coming from extruder 10 under pressure will flow upwardly of passage 60 and out through the exit orifice 13 as a tube of material. This tube is inflated by the air pressure of a compressed air source 61 connected to the central channel 62 of mandrel 44.

The core pins shown in FIGURES 2 and 3 are then threaded into the mandrel 44, or otherwise suitably secured to mandrel 44, where core pins 20 and 24 are shown in FIGURE 4. As shown in FIGURE 4, each of the core pins has a central channel such as the channel 40 for core pin 20 and channel 63 for the core pin 24. These central channels, as well as all the other channels of the remaining core pins, are then connected to a common channel 64 extending through the mandrel 44 and connected to the compressed air source 65.

Accordingly, a continuous stream of air will be discharged from the orifices in each of the core pins, whereupon the extruded film will have captured lines of air extending along the direction of the extrusion of the film, thereby imparting a corrugated effect to the film.

Thus in FIGURE 5, when the circular film extruded from discharge orifice 13 of FIGURE 4 is laid flat, it will have the general appearance shown in FIGURE 5 wherein a plurality of extending air channels 70 will be captured in the film at locations corresponding to the locations of the core pins 20 through 28.

In one embodiment of the invention, the film of FIGURE 5 will have a thickness of .110 inch, and will have four air channels per inch in the circumferential direction of the film. Each of these air channels will have a diameter of approximately .010 inch.

While FIGURES 2, 4 and 5 show the formation of the air channel directly within a single film layer, it will be apparent that a more accurate corrugated configuration could be formed in accordance with the invention through the use of lamination techniques well known in the art.

Thus, in FIGURE 6, the die of FIGURE 4 has been modified by the provision of a channel 70 which terminates in the annular ring 71 axially surrounding the interior of die body 46.

A second annular channel 72, which communicates with conduit 73, then surrounds the mandrel 44. Two additional extruders 74 and 75 are then connected to channels 70 and 73, respectively, and could, for example, define sources of thermoplastic material which differs from the thermoplastic material of extruder 10. Alternatively, the channels 70, 73 and 60 may all be connected to the outlets of a common extruder device.

In operation, the die of FIGURE 6 would normally extrude a three-ply film, or a film formed of three laminates which is extruded through the common discharge orifice 13. In accordance with the invention, however, alternate core pins are placed at the boundary of the central film and the interior and exterior film sections. That is to say, core pins such as core pin 20 and every other core pin in the system is located in the region of flow of material which is the boundary between the central laminate formed of material coming through channel 60 and the interior laminate formed of the material coming from channel 72 and extruder 75. The remaining core pins are then disposed radially outwardly of the alternate core pins including core pin 20 so that they discharge air into the boundary between the central laminate coming from channel 60 and the external laminate coming from channel 70 and extruder 74.

FIGURE 7, which is a top view of FIGURE 6, schematically illustrates the placement of the alternate core pins in an exaggerated manner. Thus, where a three laminate film is extruded which has inner, central and outer layer thicknesses of any desired value (at the exit orifice), the inner core pins will be radially displaced from the alternate pins.

Thus, core pins 20, 22, 24, and so on, are located on a small diameter, while the alternate core pins 21, 23, 25, and so on, are located on a relatively large diameter.

Accordingly, the film being discharged will have the cross-section illustrated in FIGURE 8 wherein the outer film layer 80 will be a generally smooth film formed of the material from extruder 74, while the inner layer 81 is again a smooth layer, but formed from the material coming from extruder 75.

The central layer, which is formed of material coming from extruder 10 and channel 60, will then alternately engage the interior surfaces of layers 80 and 81 by virtue of the air channels formed by the core pins which were on alternate sides of the boundary between the outer and inner films 80 and 81 and the central film 82.

Thus, a true corrugated structure is formed where the junctions between the central and corrugated wall, and the outer and inner walls are relatively uniform and homogeneous connection points for the three layers.

Clearly, any number of corrugated sections may be produced by controlling the number of core pins used adjacent the exit orifice 13. Moreover, the bond or adhesion of the corrugated inner wall is accomplished internally, thereby to prevent the formation of external weld lines.

In addition, the core pins may be arranged at an angle so that they discharge air at an angle to the axis of the tube being drawn. This will create a spiral material flow pattern which will overlay and strengthen the weld lines.

It should be further noted that while the invention has been illustrated in connection with the extrusion of a tubular film, the invention is equally applicable to the extrusion of flat or cast sheet wherein suitable core pins are arranged along the length of the die nozzle extruding the cast film.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

What is claimed is:

1. The process for forming corrugated thermoplastic sheet material which comprises the extrusion of a three-layered web defining an outer, central and inner layer of thermoplastic material through an elongated exit orifice and the injection into the body of said web at the interface and between the outer and central layers thereof of a first plurality of spaced, parallel air channels, and the injection into the body of said web at the interface and between the central and inner layers thereof of a second plurality of spaced, parallel air channels, said second plurality of air channels being alternately offset from the plane of said first plurality of air channels, to produce a film having three laminated layers wherein the central layer is in internal contact with the outer layers thereby defining a corrugated-type web.

2. The process for forming a corrugated thermoplastic tubular web which comprises the extrusion of a three-layered tubular web defining an outer, central and inner layer of thermoplastic material through an elongated annular exit orifice and the injection of a first plurality of spaced, parallel air channels into the body of said web at the interface and between the outer and central layers of said web and the injection of a second plurality of spaced parallel air channels into the body of said web which are circumferentially alternate and radially offset with respect to said first plurality of air channels at the interface and between the central and inner layers of said web, to produce a film having three laminated layers wherein the central layer is in internal contact with the outer layers thereby defining a corrugated-type tubular web.

References Cited

UNITED STATES PATENTS

| | | | |
|---|---|---|---|
| 2,260,081 | 10/1941 | Lefebure et al. | 264—173 X |
| 3,223,761 | 12/1965 | Raley | 264—95 |
| 3,274,315 | 9/1966 | Kawamura | 264—177 X |

ROBERT F. WHITE, *Primary Examiner.*

A. R. NOE, *Assistant Examiner.*